Oct. 1, 1963 J. A. LOSTETTER 3,105,944

BRIDGE TYPE D.C. TO A.C. INVERTER

Filed June 29, 1961 2 Sheets-Sheet 1

INVENTOR.
JAMES A. LOSTETTER
BY Osmund R Dahle
ATTORNEY

Oct. 1, 1963 J. A. LOSTETTER 3,105,944

BRIDGE TYPE D.C. TO A.C. INVERTER

Filed June 29, 1961 2 Sheets-Sheet 2

INVENTOR.
JAMES A. LOSTETTER

BY Osmund R. Dahle

ATTORNEY

United States Patent Office 3,105,944
Patented Oct. 1, 1963

3,105,944

BRIDGE TYPE D.C. TO A.C. INVERTER

James A. Lostetter, Minneapolis, Minn., assignor to Minneapolis-Honeywell Regulator Company, Minneapolis, Minn., a corporation of Delaware Filed June 29, 1961, Ser. No. 120,722
6 Claims. (Cl. 331—113)

The advantages of transistors in electronic apparatus are that they require no warm-up time, they dissipate relatively little power, and they permit compact packaging. These advantages lend the transistor for use in specific circuits such as power amplifiers and converters. However, these latter applications have additional requirements of a large current gain, a large voltage gain, and a high power gain. These latter requirements become incompatable to transistorized circuits due to inherent limitations of the transistors, these primarily being the magnitude of voltage to which they can be subjected. Two such limitations are the alpha equal to unity breakdown and the avalanche breakdown. As each of these breakdowns reflect on the invention, they are discussed briefly below.

The alpha equal to unity breakdown is the condition in which the base of a transistor loses control of the collector current. A graphical showing of the alpha equal unity breakdown is depicted in FIGURE 4 of the drawings. The curve shown is a characteristic curve for the common emitter connection. The mechanism of the alpha equal unity breakdown can best be explained by placing a variable potential source across the collector-emitter electrodes of the transistor shown in FIGURE 4. The base electrode of the transistor is to remain opened. As the voltage across the collector-emitter junction is increased, the electric field established by the voltage begins to attract the minority carriers within the transistor. As the voltage is further increased, the field accelerates the minority carriers. These accelerated carriers begin to collide with the valence electrons within the crystal structure of the transistor. The collision of the minority carriers and the valence electrons creates an increase of free electrons, hence, an increased current flow according to a multiplication factor. This multiplication factor is defined as the ratio of the actual current flow through the transistor to the current flow without collision.

At some order of differential voltage magnitude between the collector-emitter junction, the current through the transistor will increase rapidly toward infinity with no further increase in collector-emitter voltage unless limited by some external circuit impedance. The order of voltage magnitude at which the current goes from relatively voltage dependent to relatively voltage independent is generally well defined, and, it is this voltage, collector-emitter, which is defined as the alpha equal unity breakdown voltage and one particular type of transistor used occurs in the range of 50–80 volts. The alpha equal unity breakdown is in some respects similar to the Zener voltage since the collector-emitter voltage remains relatively constant as collector current increases very rapidly.

The second limiting voltage of a transistor, significant to the instant invention, is the avalanche breakdown voltage. The avalanche breakdown is depicted in FIGURE 3 of the drawings and occurs at approximately 160 volts in the particular transistors used. This curve represents the common-base connection of a transistor. The avalanche breakdown is in some respects similar to the alpha equal unity breakdown since it is also caused by the accelerated minority carriers striking or colliding with the valence electrons within the crystal structure. However, in the avalanche breakdown, it is the collector-base diode which breaks down whereas in the alpha equal unity breakdown, it is the collector-emitter junction which breaks down. Furthermore, the avalanche breakdown phenomena is in no way dependent on transistor action. The significant operating difference between the alpha equal unity breakdown and the avalanche breakdown is the order of voltage level at which the breakdown occurs. In the specific transistor used for deriving the characteristics curves of FIGURES 3 and 4, the avalanche breakdown is twice as high as the alpha equal unity breakdown. It is distinctly pointed out that the curves shown in FIGURES 3 and 4 are typical of a specific transistor and are in no way construed as a limitation of the scope of this invention.

As has been previously mentioned, the requirements of power amplifiers and converters are that they have a large voltage gain and a high power gain. To obtain these high gains, the transistor must generally be operated in a common emitter configuration as shown by a co-pending application 619,003, filed October 29, 1956, and assigned to the same assignee as the present invention. However, as seen from FIGURE 4, the maximum voltage to which the common emitter circuit can be subjected is limited by the alpha equal unity breakdown. This means that the voltage, according to our selected sample transistor, cannot exceed 80 volts. However, in actual operation, the maximum safe voltage would be in the order of only 40 volts.

To overcome this limitation, it would seen that the common base configuration as shown in FIGURE 3 would be better as it permits higher operating voltages. However, the common base configuration has a current gain less than unity; but, it does have a large voltage gain. The net result is that the common base configuration has an overall power gain of low to intermediate in respect to the common emitter configuration.

The applicant has recognized the advantages of the common base connection and the common emitter connection for use in a bridge type D.C. to A.C. inverter or converter and has combined these two in a compounded common emitter-common base connection in each leg of the bridge circuit to form a new and novel power amplifier. The result of this compound connection permits the bridge converter circuit to be operated from a much higher voltage source; i.e. in the sample transistor a voltage source of 130 volts is considered reasonable in view of the transistor's avalanche breakdown. The compound connection has an overall power gain somewhat less than the common emitter connection but this disadvantage is outweighed by the advantage of it being able to use a much higher voltage and thereby convert a much larger amount of power from D.C. to A.C.

The object of this invention is to provide an improved transistor power amplifier for converting D.C. to A.C. in which the amplifier is arranged in a bridge configuration to provide maximum alternating type power with controllable frequency and with inherent short circuit protection to a load device.

Another object of this invention is to have the maximum operating voltage of the power amplifier limited by the avalanche breakdown instead of the alpha equal unity breakdown.

A further object of this invention is to provide within the bridge network itself a self-bias arrangement to supply the necessary working voltage to the common emitter connection. This bias arrangement insures that the alpha equal unity breakdown voltage for this common emitter connection is never exceeded.

These and other objects of the present invention will be understood upon consideration of the accompanying specification, claims, and drawing of which:

Figure 1:
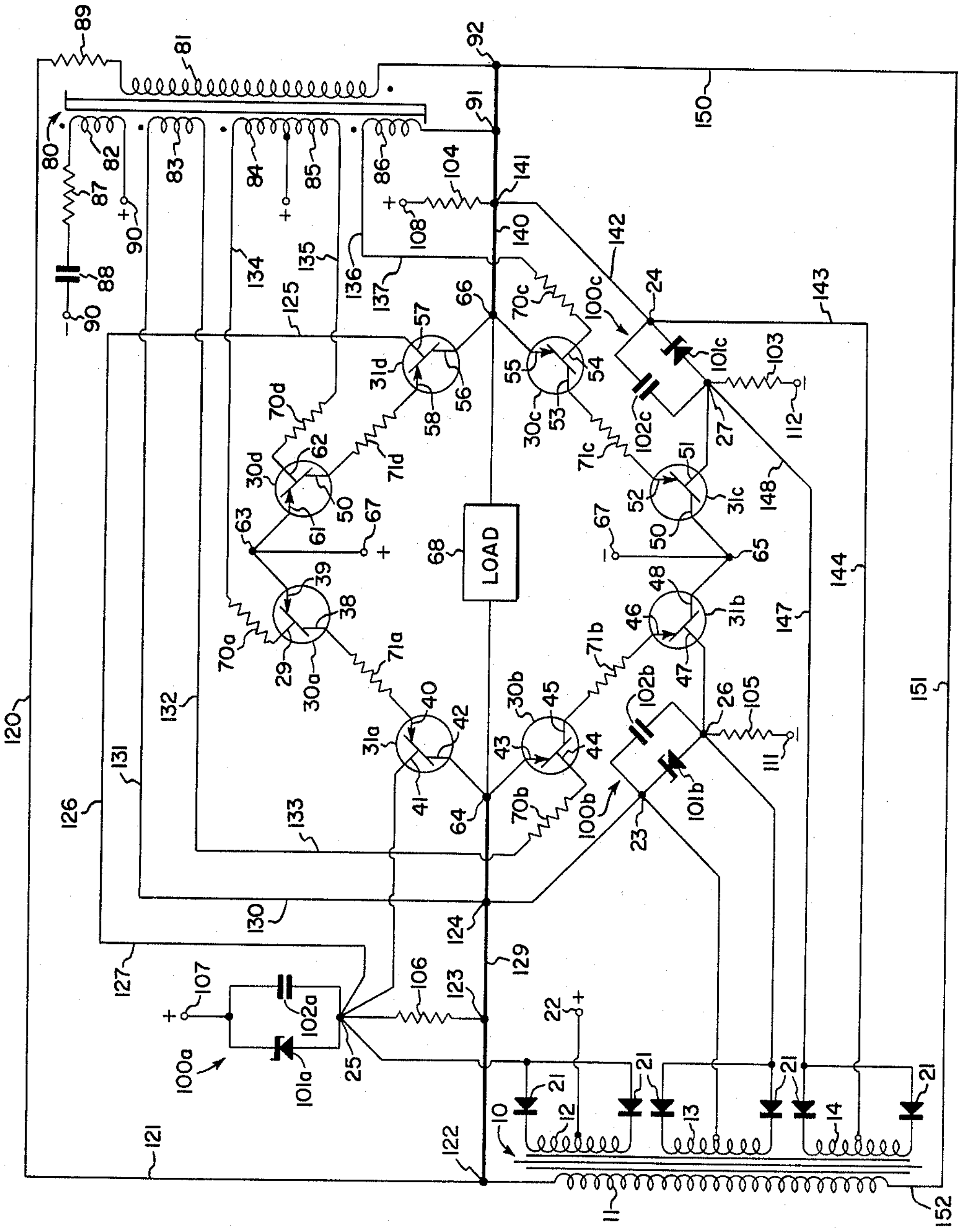
FIGURE 1 is a schematic representation of the transistor bridge type amplifier and converter circuit embodying the invention.

Referring to FIGURE 1 there is disclosed a power amplifying circuit having generally a bridge configuration, the bridge circuit having a pair of input terminals 63 and 65 and a pair of output terminals 64 and 66. A bias supply transformer 10 includes a primary winding 11 and a plurality of secondary windings 12, 13, and 14. The bias transformer 10 has the upper end of its primary 11 connected to output terminal 64, through a terminal 122 and a common bus 129. The lower end of primary winding 11 is connected through leads 152, 151, 150, a terminal 92, and a common bus 140 which in turn is connected to the other bridge output terminal 66. The secondary windings 12, 13, and 14 are connected respectively to supply a full wave rectified output through rectifying diodes 21 to voltage reference Zener type diodes **101*a*, 101*b*, and 101*c*. Specifically, the output of secondary winding 12 is connected by a terminal 25 to Zener 101*a*; one terminal of the output of secondary winding 13 is connected by a terminal 26 to Zener 101*b* and the output of secondary winding 14 is connected by a terminal 27 to Zener 101*c* through leads 147 and 148. The center taps of the secondary windings 12, 13, 14 are returned to the opposite sides or terminals of Zener diodes 101*a*, 101*b*, and 101*c* respectively. Specifically, the center tap of secondary winding 14 is connected to a terminal 24 through lead 144, 143. The center tap of 13 is connected to a terminal 23. The secondary winding 12 has its center tap returned to the positive terminal 22 of the voltage source which is common to a terminal 107 and completes the current path through Zener diode 101*a*** to terminal 25. The purpose of these secondaries 12, 13, 14 is to supply a source of energy for proper biasing of the bridge circuit.

A plurality of semiconductors, here shown as **30*a***, *b*, *c*, *d* and 31, *b*, *c*, *d* form a bridge configuration in respect to a voltage supply at 67 which is attached across the power input 63 and 65 and a load device 68 which is connected across the output terminals 64 and 66. In the upper left leg of the bridge network, transistor **30*a* has its emitter 39 connected to the input terminal 63 which in turn is connected to the positive terminal of the voltage supply at 67. The collector 38 of transistor 30*a*, is connected to a resistor 71*a* which in turn is connected to an emitter 40, of transistor 31*a*. Collector 42 of transistor 31*a* is connected to the output terminal 64. These two transistors 30*a* and 31*a* constitute one compounded common-emitter common-base configuration for one leg of the bridge network. Similarly, transistor 30*b* has its emitter 43 connected to the terminal 64 and its collector 45 connected to a resistor 71*b*. Resistor 71*b* has its lower end connected to an emitter 46 of transistor 31*b*. A collector 48 of transistor 31*b*** is connected to the power input terminal 65 which in turn is connected to the negative terminal of the voltage supply at 67.

The transistor **30*d* in the upper right hand leg of the bridge network has its emitter 61 connected to the terminal 63 which is common to the voltage supply at 67. A collector 50 of transistor 30*d* is connected to a resistor 71*d* which in turn is connected to an emitter 58 of transistor 31*d*. A collector 56 of transistor 31*d* is connected to the output terminal 66, which in turn is also connected to an emitter 55 of transistor 30*c*. Collector 53 of transistor 30*c* is connected through a resistor 71*c* to an emitter 52 of transistor 31*c*. The collector 50 of transistor 31*c*** completes the four leg bridge by its connection to the power input terminal 65 and, hence, the negative side of the power supply at 67. Although the transistors shown are the PNP type, it is obvious that NPN types could be substituted.

Connected to the base 41 of transistor **31*a* is a constant voltage bias regulator shown generally at 100*a* comprising a Zener diode 101*a* in parallel with a capacitor 102*a*. The upper terminal 107 of the bias voltage supply for transistor 31*a* is connected to the positive side of the power supply at 67. The lower terminal 25 of the bias supply for transistor 31*a* is connected through a limiting resistor 106 to a terminal 123 which directly connects to bridge junction 64 through common bus 129. The bias supply for transistor 31*a* is also the bias supply for transistor 31*d*. The connection to transistor 31*d* can be traced from the terminal 25 through leads 127, 126, and 125 to the base 57 of transistor 31*d*. Similar bias supplies 100*b* and 100*c* are shown for transistors 31*b* and 31*c*. For transistor 31*b*, the bias supply 100*b* is connected to the base 47 from the terminal 26. Terminal 26 is further connected to the minus side of the power supply at 67 by terminal 111 through a resistor 105. The other side of the Zener diode 101*b***, opposite terminal 26, is connected to terminal 23 which is further connected to a terminal 124, which is directly connected to junction 64 through common bus 129.

The bias supply for transistor **31*c* connects the base 51 to the terminal 27 which in turn is connected to the minus side of the power supply at 67 by terminal 112 through a resistor 103. Terminal 27 is connected through Zener reference diode 101*c* to a terminal 24 which in turn is connected by a lead 142 to a terminal 141 which is directly connected by the common bus 140 to junction 66. From terminal 141 a resistor 104 connects to the positive side of the power supply at 67 by terminal 108. These bias supplies maintain a relatively constant voltage difference on the base of transistors 31*a*, 31*b*, 31*c* and 31*d*** with respect to the voltage of emitters 39, 43, 55, and 61, respectively, irregardless of how the potential at terminals 64 and 66 fluctuates.

A saturable feedback transformer having a substantially rectangular hysteresis loop is shown generally at 80. This feedback transformer comprises a primary winding 81 having one extremity connected to a terminal 92, which terminal 92 is directly connected to junction 66 through common bus 140, and having the upper extremity connected to terminal 122 through a current limiting resistor 89, lead 120 and 121. Terminal 122 is directly connected to junction 64 through the common bus 129. Transformer 80, has a plurality of secondaries shown at 82, 83, 84, 85, and 86. The secondaries 83–86 supply a feedback signal to transistors **30*b*, 30*a*, 30*d*, and 30*c*, respectively, according to the potential appearing across the primary winding 81. The circuit for the feedback supply to transistor 30*b* can be traced from the base electrode 44 through a resistor 70*b*, leads 133, 132, and the secondary 83. The other side of secondary 83 can be traced through a lead 131, lead 130, and terminal 124, 124 being connected to the common bus 129. The secondary 84 has one side connected to the positive side of the power source at 67 and has the other side connected through a lead 134, a resistor 70*a* to base 29 of resistor 30*a*. Secondary 85 has one side of its transformer connected to the positive side of the power supply at 67 and its other side connected through a lead 135 through resistor 70*d* to base 62 of transistor 30*d*. Emitters 39 and 61 are directly connected to the positive side of the power source to complete the circuit. The secondary winding 86 has one side connected to terminal 91 which in turn is connected to terminal 66 through common bus 140 and emitter 55. The other side of the secondary 86 is connected through lead 136, 137, and through a resistor 70*c* to base 54 of transistor 30*c***.

The feedback transformer 80, further has a starting circuit. This starting circuit is connected across the power supply at 67 as shown by terminals 90. The circuit for the starting circuit can be traced from the negative terminal 90 through a capacitor 88, a resistor 87 and the secondary 82 of the transformer 80. The purpose of this starting circuit is to apply a predetermined initial On voltage pulse to transistors 30*a* and 30*c*. This starting circuit could also be arranged to apply a predetermined On signal to transistors 30*b* and 30*d*.

In one successful operating embodiment of the invention of FIGURE 1 the values of components are shown below:

| | |
|---|---|
| Diodes 21 | 1N1449 |
| Zener diodes 101*a*, *b*, *c* | 1N753A |
| Capacitors 102*a*, *b*, *c* ____ μf | 0.5 |
| Capacitor 88 ____ μf | 8 |
| Resistor 106 ____ ohms | 10K |
| Resistor 105 ____ do | 10K |
| Resistor 103 ____ do | 10K |
| Resistor 104 ____ do | 10K |
| Resistors 70*a*, *b*, *c*, *d* ____ do | 15 |
| Resistors 71*a*, *b*, *c*, *d* ____ do | 0.5 |
| Resistor 89 ____ do | 160 |
| Resistor 87 ____ do | 2.7K |
| Transistors 30*a*, 30*b*, 30*c*, 30*d* | 3N47 |
| Transistors 31*a*, 31*b*, 31*c*, 31*d* | H5X3 |
| Voltage supply at 67 ____ volts | 130 |

*Operation*

This invention is directed towards the improvement of a transistor D.C.-A.C. converter so that it can be operated from a D.C. source, the magnitude of which is large with respect to the alpha equal unity breakdown of the transistor, for example, from a source of approximately 130 volts where the alpha equal unity breakdown is in the area of 70 volts in the case of germanium transistors. The transistors 30*a*, 30*b*, 30*c*, and 30*d* are operated in a common emitter configuration. In this configuration, the input signal is applied across the base-emitter junction and the output signal is taken across the collector-emitter junction. In the common emitter configuration, the significant limiting breakdown voltage is the alpha equal unity breakdown which is low in respect to the avalanche breakdown.

The transistors 31*a*, 31*b*, 31*c*, and 31*d* are operated in a common base configuration. In this configuration, the input signal is applied across the emitter-base junction and the output is taken across the collector-base junction, the base being common to both input and output circuits. With this configuration the significant limiting voltage is the avalanche breakdown which is relatively high in respect to the alpha equal unity breakdown. Therefore, this type configuration can operate at a much higher voltage level.

To obtain the advantages of both the common emitter and the common base configuration for converting a high D.C. voltage to A.C., I have combined these two into a new and novel compounded configuration. Under this arrangement, I achieve the necessary power gain required of a power amplifier and converter, as well as, use a much higher voltage than prior systems as shown for example by the above mentioned co-pending application 619,003.

One problem of the compounded common-emitter common-base configuration is the supply of biasing voltage. Generally, a separate bias battery or bias source is supplied for each compounded configuration. In the instant invention, the individual bias sources are replaced by a bias arrangement having a Zener diode acting as a voltage regulator and a full-wave rectifier energized from currents appearing within the bridge network of FIGURE 1. The bias arrangement maintains the voltage between the base of the common-base stage and the emitter of the common-emitter stage relatively constant irrespective of potential appearing across the entire compounded configuration. This biasing prevents the alpha equal unity breakdown voltage from being exceeded on the common-emitter stage. This biasing further assures that the maximum voltage drop appears across the collector-base junction of the common base stage, this is the junction limited by the avalanche breakdown voltage. Hence, the Zener diode regulator and full wave rectifier maintains the proper bias within the compounded configuration irregardless of voltage across the configuration without the use of separate bias sources.

Assume that power is supplied to the various terminals indicated as positive and negative. Power so supplied will flow from positive terminal 90 of the starting circuit, through secondary winding 82 of transformer 80, through resistor 87, capacitor 88 and to the minus side of the power supply at 90. The surge current flowing through the secondary 82 will induce voltages in the secondaries 83, 84, 85, 86 in the manner shown by the dots, the dots representing a negative induced voltage. This induced voltage in secondary 83 will place a positive signal on transistor 30*b* through lead 132, 133, through resistor 70*b* and base 44. This will reverse bias transistor 30*b* turning it Off. Likewise, the induced voltage in the secondary 85 will place a positive voltage on transistor 30*d* through lead 135, resistor 70*d* and the base 62. This positive signal on base 62 will turn transistor 30*d* Off. The induced voltage in the secondary 84 of transformer 80 will place a negative signal on the base 29 of transistor 30*a* through lead 134 and resistor 70*a*. This negative voltage on transistor 30*a* will cause this transistor to turn On. Likewise, the induced voltage in the secondary 86 will be applied through lead 136, 137, through resistor 70*c*, and to the base 54 turning transistor 30*c* On. In summary, the surge current flowing through the starting circuit will turn transistors 30*a* and 30*c* On and turn transistors 30*b* and 30*d* Off.

Power also appears at positive terminal 67, input terminal 63 and emitter 39. Since the base 29 of the common emitter transistor 30*a* is negative in respect to the emitter 39, current will flow from terminal 63, through transistor 30*a* to resistor 71*a* and the emitter 40 of common base transistor 31*a*. The biasing network 100*a* connected to the base 41 of transistor 31*a* is holding the base approximately 6.2 volts negative in respect to the terminal 63 associated with transistor 30*a*. This arrangement makes the base 41 of transistor 31*a* negative in respect to the emitter 40 permitting transistor 31*a* to conduct current to output terminal 64. The current at terminal 64 cannot flow through transistor 30*b* since this transistor has been turned Off by the signal induced in winding 83. The current will then flow from output terminal 64, through a load 68, to output terminal 66. From terminal 66, the current will flow to the emitter 55 of common emitter transistor 30*c*, transistor 30*c* being turned On by the negative signal induced in the secondary 86 of transformer 80. The current from the emitter 55 of transistor 30*c* will flow to the collector 53, through resistor 71*c* and appear at the emitter 52 of common base transistor 31*c*. Since the base 51 of the transistor 31*c* is held negative by the biasing network 100*c* in respect to the emitter 55 of transistor 30*c*, current will flow through transistor 31*c* to the collector 50, to input terminal 65 and to the negative side of the power supply at 67.

The flow of current through the load 68 from output terminal 64 to output terminal 66 provides a substantial voltage thereacross which will cause currents to flow in both the primary winding 81 of feedback transformer 80 and the primary winding 11 of bias transformer 10. The direction of current flow through the primary 81 of feedback transformer 80 will be from terminal 64, common bus 129, to terminal 122 lead 121, lead 120 resistor 89 and through primary 81 to the terminal 92, common bus 140 and to terminal 66. The current flow through the primary 81 will induce an aiding voltage in respect to the starting surge in each of the secondaries 82, 83, 84, 85, and 86. This induced voltage will further increase the conduction state of transistors 30*a*, 31*a*, 30*c*, and 31*c*.

Transistors 30*a*, 31*a*, 30*c* and 31*c* will continue conducting until saturable transformer 80 reaches its saturation state. At this time, the flux change will not only diminish inducing no further voltage in secondaries 83–86, but finally, the flux field will start to collapse inducing a voltage in secondaries 83–86 opposite to the original starting voltage. The result of the reversed induced voltage will be that transistor 30*a* and 30*c* will be turned Off while transistor 30*b* and 30*d* will be turned On. The current flow traced from the positive terminal 67 will now be from input terminal 63, the emitter 61 of transistor 30*d*, the collector 59, through resistor 71*d*, to the emitter 58 of transistor 31*d*, to collector 56 which in turn is connected to the output terminal 66. Since transistor 30*c* is biased Off, the current will flow through the load 68 to the output terminal 64. From terminal 64 the current will flow through transistor 30*b* which is now biased On. From the collector 45 of transistor 30*b*, current will flow through resistor 71*b*, emitter 46 of transistor 31*b* and to the collector 48. From 48, it will flow to input terminal 65 and to the negative side of the power supply at 67.

At the same time, in which the terminal 64 is more positive than terminal 66, transistors 30*a*, 31*a*, 30*c*, and 31*c* On, current is also flowing through the winding 11 of transformer 10. The current flow through the primary winding 11 can be traced from terminal 122 through winding 11, lead 152, 151, and 150 to terminal 92 which in turn is connected to terminal 66 through common bus 140. The current flow through winding 11 will induce in the secondaries 12, 13, 14 a voltage which will produce current flow through the rectifying diodes 21 to the center tap of each associated secondary. The secondaries 12, 13, 14 supply through diodes 21 a full wave rectified signal to the biasing networks 100*a*, *b*, *c*. These full wave rectifiers will maintain the necessary breakdown voltage across each Zener diode 101*a*, *b*, *c*, so that the voltage across the Zener diode will remain at approximately 6.2 volts. It is to be understood that the 6.2 volts is for illustrative purposes only and in no way is construed as a limit to the scope of the invention. It contemplated that other Zener diodes having different voltage drops could be substituted. Furthermore, the biasing arrangement shown by transformers 10 and biasing network 100*a*, *b*, *c* could be replaced by batteries or other voltage sources, the only criteria being that the bias voltage maintain the potential, i.e. the voltage from the base of the common base transistor such as 31*a* to the emitter of the common emitter of transistor such as 30*a*, below the alpha equal unity breakdown.

In summary, the starting circuit will turn transistor 30*a* and transistor 30*c* On which in turn will turn transistors 31*a* and 31*c* On. With these transistors On the direction of current flow through the load 68 will be from terminal 64 to terminal 66. At the same time due to output terminal 64 being more positive than terminal 66, a current will flow down through the primary of feedback winding 81 inducing a voltage in the secondaries 83, 84, 85, and 86 of an aiding polarity to the initial starting surge. At the same instant, current will also flow down through primary winding 11 of feedback transformer 10 to maintain the necessary biasing voltage for transistors 31*a*, 31*b*, 31*c*, and 31*d*.

As the flux produced by the current flowing in the primary winding 81 of feedback transformer 80 collapses, the conduction state of transistors 30*a* and 30*c* are turned to an Off condition and that of transistors 30*d* and 30*b* to an On condition. With these two transistors, 30*d*, 30*b* On, the direction of current through the load 68 will be from terminal 66 to terminal 64. From this it can be seen that the current flow through the load is reversed in accordance with the feedback signal applied to the common-emitter transistors. Hence, the entire circuit operates in a manner to convert a relatively high direct current voltage into an alternating current voltage at a selected frequency. The frequency at which current through load 68 reverses is selected in any number of ways. Some of the preferred ways are: changing the core material or changing the core area of transformer 80, changing the turns ratio of the windings, changing the value of feedback resistor 89 which in turn will increase or decrease the input voltage to winding 81, or, changing the magnitude of voltage across power input terminals 67 which in turn will change the voltage applied across primary winding 81.

The circuit that I have disclosed in FIGURE 1 has an additional feature to make it more suitable for many high voltage or high power applications. If at any time the output load 68 appears as a short circuit, the potential difference between output terminals 64 and 66 is zero or nearly zero. Hence, it will be appreciated that the input voltage to feedback transformer is insufficient to cause this transformer to saturate. As the induced voltage in secondaries 83–86 depends on the saturation of transformer 80, the turn-on and turn-off voltages to the common-emitter stages 30*a*–30*c* are zero. Therefore, the circuit shown in FIGURE 1 will shut down or cease operating. The circuit will remain in this shut down condition, with no degrading effect, until the short appearing at the load 68 is removed.

Figure 2:
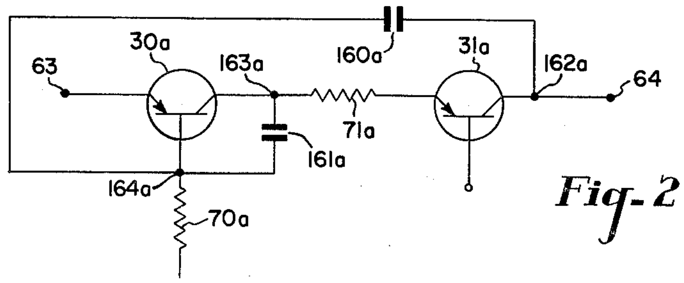
FIGURE 2 is a modification of one leg of the bridge circuit of FIGURE 1.
Figure 3:
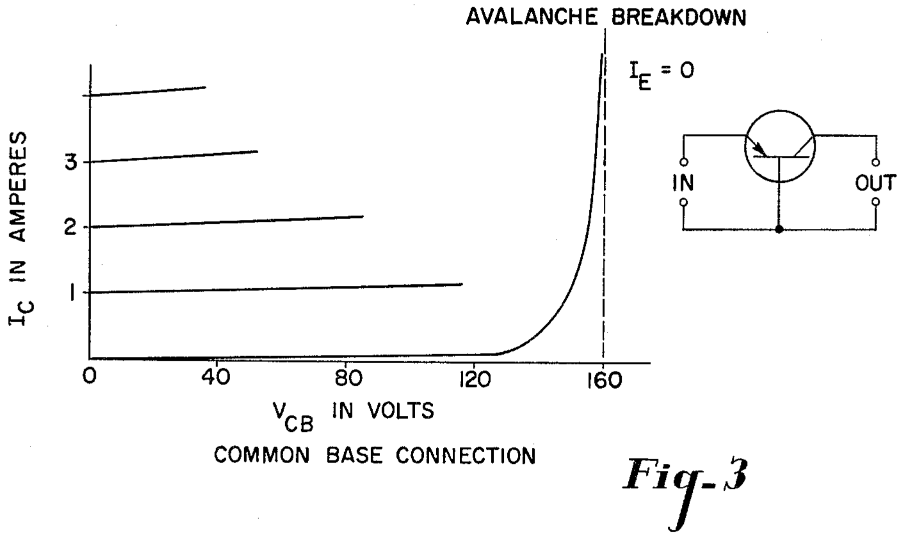
FIGURE 3 is a characteristic curve of a common base connection.
Figure 4:
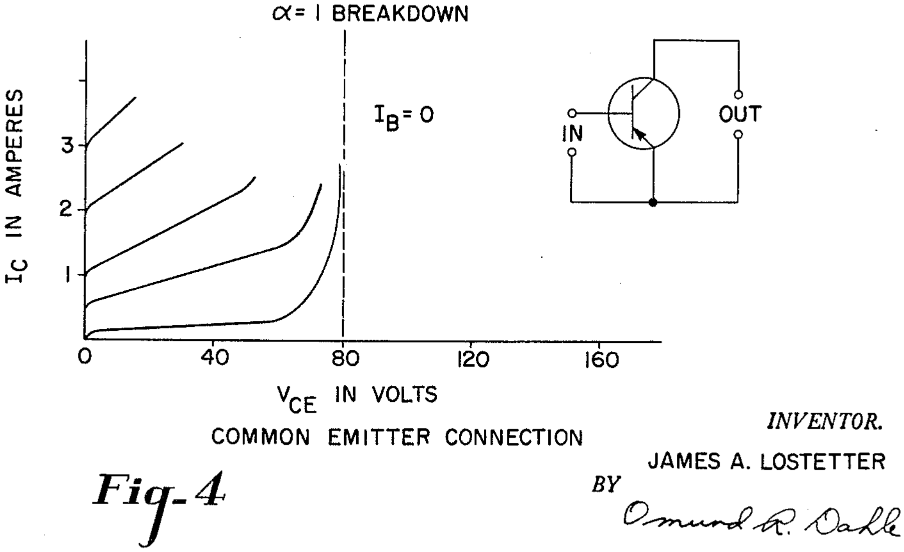
FIGURE 4 is a characteristic curve for a common emitter connection.

FIGURE 2 shows a modification for the bridge network shown in FIGURE 1. It is to be understood, that this modification could be used in one or all legs of the bridge shown in FIGURE 1. The symbols common to FIGURE 1 and FIGURE 2 are used to more clearly show how the modified leg would be connected in the upper left hand leg of the bridge network.

In a common emitter stage, the signal is applied across the base-emitter junction, and, the output signal is taken across the collector-emitter junction. In a common base circuit, the signal is applied across the emitter-base junction and the signal is taken from the collector-base junction. When it is desirous to have feedback in a particular circuit, it is customary to take a small portion of the output signal and feed it back into the input of the circuit. In the modification as shown in FIGURE 2, the feedback is applied for the common-emitter circuit by means of capacitor 161*a* and for the common base circuit by capacitor 160*a*. The feedback in the common emitter circuit is taken from the output terminal 163*a*, through capacitor 161*a* and to the input terminal 164*a*. The capacitor 161*a* is so selected to supply the optimum feedback to the common emitter transistor.

In the common base circuit, the feedback is taken from terminal 162*a*, through capacitor 160*a* and back to terminal 164*a* associated with the common emitter stage. The value of capacitor 160*a* is so selected to produce the optimum feedback from the output 162*a* of the common base transistor to the input shown at 164*a*. It is assumed, that other feedback arrangements could be used, the primary purpose being to supply a feedback signal to obtain a maximum performance of the power amplifier and converter configuration.

Heretofore, I have disclosed a new and novel semiconductor power amplifier and converter capable of operating at higher voltages than the alpha equal unity breakdown and still have a suitable power gain. Furthermore, I have disclosed an arrangement whereby the biasing supply for the amplifier and converter is generated within the system itself. Although I have disclosed my invention in light of germanium type transistors, it is obvious that silicon type transistors could be readily substituted by any person having ordinary skill in the art. It is well recognized in the art that silicon transistors generally are more suitable for higher voltages than are germanium type transistors.

Also, it is obvious that a tetrode type transistor could be used in my invention in lieu of the triode type disclosed. It is therefore, apparent that the invention is not limited to the particular embodiments disclosed but that various modifications and applications may be made without departing from the scope and spirit of the invention.

While the invention has been described in detail in connection with the preferred forms illustrated, it will be understood that modifications may be made within the scope of the invention as defined in the claims which follow.

I claim:

1. A transistor system for converting a direct current voltage, which is relatively large in magnitude with respect to the emitter-collector alpha breakdown voltage of the transistor, into alternating current comprising; a bridge type network having input and output terminals, said bridge network arranged to have four legs to selectively conduct current from said input terminals to said output terminals; a source of direct current connected to said input terminals; a load device connected to said output terminals; a plurality of first transistors each having base, emitter and collector electrodes and each operated in common emitter configuration; a plurality of second transistors each having base, emitter and collector electrodes and each operated in common base configuration; one of said first plurality of transistors and one of said second plurality of transistors connected by conductive means to form each of said legs in said bridge network, said conductive means connecting the collector of said first transistor to the emitter of said second transistor; feedback means connected to each base electrode of said plurality of first transistors, said feedback means responsive to current flow in said bridge network and arranged to energize said first transistors; bias means connected to each base electrode of said plurality of second transistors, said bias means arranged to maintain a relatively constant and low magnitude of voltage difference between the base of said second transistor and the emitter of said first transistor, the bias arrangement thereby causing said relatively high direct current voltage to appear across the collector-base junction of said second transistor.

2. A transistor system for converting a direct current voltage, which is relatively large in magnitude with respect to the emitter-collector alpha breakdown voltage of the transistor, into alternating current comprising; a bridge type network having input and output terminals, said bridge network arranged to have four legs for selectively conducting current from an input terminal to an output terminal; a source of relatively large direct current connected to said input terminals; a load device connected to said output terminals; a plurality of first transistors each having base, emitter and collector electrodes and each operated in common emitter configuration; a plurality of second transistors each having base, emitter and collector electrodes and each operated in common base configuration; one of said first plurality of transistors and one of said second plurality of transistors connected by conductive means to form each leg in said bridge network, said conductive means connecting the collector of said first transistor to the emitter of said second transistor; feedback means connected to each base electrode of said plurality of first transistors, said feedback means responsive to current flow in said bridge network and arranged to energize said first transistors to selectively permit current conduction in two of said legs; bias means connected to each base electrode of said plurality of second transistors, said bias means energized from current flow in said bridge network, said bias means arranged to maintain a relatively constant but low magnitude of voltage difference between the base of said second transistor and the emitter of said first transistor, the bias arrangement thereby causing said relatively high direct current voltage to appear across the collector-base junction of said second transistor.

3. A transistor system for converting a direct current voltage, which is relatively large in magnitude with respect to the emitter-collector alpha breakdown voltage of the transistor, into an alternating current of a predetermined frequency comprising; a bridge type network having input and output terminals, said bridge network arranged to have four legs for selectively conducting current from an input terminal to an output terminal; a source of relatively large direct current connected to said input terminals; a load device connected to said output terminals; each of said legs defining said bridge network having therein a first and a second transistor each having a base, emitter and collector electrodes, said first transistor operated in common emitter configuration, said second transistor operated in common base configuration, said first and second transistors joined by conductive means which connects the collector of said first transistor to the emitter of said second transistor; feedback means including a saturable core transformer connected to the base electrode of each first transistors, said saturable core transformer responsive to current flow at said output terminals and arranged to selectively energize two of said first transistors into conduction when saturating in a first direction and to selectively energize another two of said first transistors into conduction when said transformer is saturating in another direction; said feedback means further determining the alternating current frequency; bias means connected to the base electrode of each second transistors, said bias means responsive to current flow at said load to maintain the voltage potential from the base electrode of said first transistors relatively constant and of low magnitude in regard to said alpha breakdown voltage, the whole system operating for the purpose to convert a large direct current voltage into an alternating current across said load and to shut said system off when an electrical short appears across said load.

4. A transistor system for converting a direct current voltage, which is relatively large in magnitude with respect to the emitter-collector alpha breakdown voltage of the transistor, into alternating current comprising; a bridge type network having input and output terminals, said bridge network arranged to have four legs for selectively conducting current from an input terminal to an output terminal; a source of relatively large direct current connected to said input terminals; a load device connected to said output terminals; each of said legs defining said bridge network having therein a first and a second transistor each having a base, emitter and collector electrodes, said first transistor operated in common emitter configuration, said second transistor operated in common base configuration, said first and second transistors joined by conductive means which connects the collector of said first transistor to the emitter of said second transistor; feedback means including a saturable core transformer connected to the base electrode of each first transistors, said saturable core transformer responsive to current flow across said load and arranged to selectively energize two of said transistors into conduction when saturating in a first direction and to selectively energize another two of said first transistors into conduction when said transformer is saturating in another direction, said feedback means further having starting means to insure that two of said first transistors are energized at a predetermined initial time; bias means including a full wave rectifier connected to the base electrode of each second transistor, said bias means further having a Zener diode which is so selected to maintain the voltage potential from the base electrode of said second transistor to the emitter electrode of said first transistor relatively constant and of low magnitude in regard to said alpha breakdown voltage, the said bias means thereby insuring that the transistor alpha breakdown voltage is not exceeded; the whole system operating for the purpose to convert a relatively large direct current voltage into an alternating current.

5. A transistor system for converting a direct current voltage, which is relatively large in magnitude with respect to the emitter-collector alpha breakdown voltage of the transistor, into alternating current comprising; a bridge type network having input and output terminals, said bridge network arranged to have four legs to selectively conduct current from said input terminals to said output terminals; a plurality of first transistors each having base, emitter and collector electrodes and each operated in common emitter configuration; a plurality of second transistors each having base, emitter and collector electrodes and each operated in common base configuration; one of said first plurality of transistors and one of said second plurality of transistors arranged in each leg of said bridge network, said emitter and collector electrodes of said first and second transistors connected in a series circuit configuration in each leg of said bridge; feedback means connected to each base electrode of said plurality of first transistors, said feedback means responsive to current flow in said bridge network and arranged to energize said first transistors; bias means connected to each base electrode of said plurality of second transistors, said bias means arranged to maintain a relatively constant and low magnitude of voltage difference between the base of said second transistor and the emitter of said first transistor, the bias arrangement thereby causing said relatively high direct current voltage to appear across the collector-base junction of said second transistor.

6. A transistor system for converting a direct current voltage, which is relatively large in magnitude with respect to the emitter-collector alpha breakdown voltage of the transistor, into alternating current comprising; a bridge type network having input and output terminals, said bridge network arranged to have four legs to selectively conduct current from said input terminals to said output terminals; a plurality of first transistors each having base, emitter and collector electrodes and each operated in common emitter configuration; a plurality of second transistors each having base, emitter and collector electrodes and each operated in common base configuration; said first and second transistors having emitter and collector electrodes arranged in each leg of said bridge network, said emitter and collector electrodes of said first and second transistors connected in a series circuit configuration in each leg of said bridge, said first and second transistors further having base electrodes connected to control, when energized, the flow of current from said emitter to said collector; feedback means connected to the base electrode of each of said first transistors, said feedback means responsive to current flow at said output terminals and arranged to energize said base electrodes of said first transistors to control the current flow simultaneously in said legs, said feedback means further including starting means to energize said first transistors in two of said four legs; bias means connected to the base electrode of each of said second transistors, said bias means energized from the current flow at said output terminals; a source of direct current connected to said input terminals; and a load device connected to said output terminals, the whole system operating for the purpose to alternately reverse the direction of current flow through said load in accordance with the feedback applied to said first transistors.

References Cited in the file of this patent

UNITED STATES PATENTS

| | | |
|---|---|---|
| 2,821,639 | Bright et al. | Jan. 28, 1958 |
| 2,965,856 | Roesel | Dec. 20, 1960 |